United States Patent [19]

Sondén et al.

[11] Patent Number: 5,618,142
[45] Date of Patent: Apr. 8, 1997

[54] SELF-DRILLING BLIND RIVET AND METHOD FOR MAKING A PRESSURE TIGHT RIVETED JOINT BY MEANS OF THE SAME

[75] Inventors: Carl-Gustaf Sondén, Ängelholm; Kenneth Lennartsson, Torekov, both of Sweden

[73] Assignee: Lindab AB, Bastad, Sweden

[21] Appl. No.: 564,168

[22] PCT Filed: Jun. 15, 1994

[86] PCT No.: PCT/SE94/00587

§ 371 Date: Dec. 14, 1995

§ 102(e) Date: Dec. 14, 1995

[87] PCT Pub. No.: WO94/29602

PCT Pub. Date: Dec. 22, 1994

[30] Foreign Application Priority Data

Jun. 16, 1993 [SE] Sweden ................... 9302100
Jul. 8, 1993 [SE] Sweden ................... 9302373

[51] Int. Cl.⁶ .................. F16B 13/04; B23P 11/02
[52] U.S. Cl. .................. 411/29; 411/43; 29/525.06
[58] Field of Search ................. 411/29, 30, 31, 411/43, 69, 70, 38; 29/524.1, 525.06, 526.2

[56] References Cited

U.S. PATENT DOCUMENTS

| | | |
|---|---|---|
| 2,372,222 | 3/1945 | Mullgardt . |
| 2,405,898 | 8/1946 | Milone et al. ............... 218/29 |
| 2,423,956 | 7/1947 | Amtsberg ................... 218/19 |
| 2,466,811 | 4/1949 | Huck ....................... 218/29 |
| 2,536,353 | 1/1951 | Cooper ...................... 35/40 |
| 2,562,724 | 7/1951 | Lebert ...................... 218/29 |
| 2,588,907 | 3/1952 | Colley ...................... 218/29 |
| 2,612,073 | 9/1952 | Taylor . |
| 2,751,809 | 6/1956 | Barker . |
| 2,803,984 | 8/1957 | Swenson . |
| 2,931,532 | 4/1960 | Gapp ....................... 218/29 |
| 2,997,910 | 8/1961 | Tinnerman . |
| 3,009,384 | 11/1961 | Degen et al. . |
| 3,053,046 | 9/1962 | Fleming, Jr. . |
| 3,148,578 | 9/1964 | Gapp . |
| 3,193,921 | 7/1965 | Kahn ........................ 29/509 |
| 3,391,449 | 7/1968 | Briles ....................... 29/522 |
| 3,403,593 | 10/1968 | Moore . |
| 3,659,449 | 5/1972 | Abernathy ................... 72/391 |
| 3,750,518 | 8/1973 | Rayburn ..................... 411/29 |
| 3,935,786 | 2/1976 | Murray et al. . |
| 4,585,383 | 4/1986 | Kraemer ..................... 411/43 X |
| 4,920,833 | 5/1990 | Rosenthal ................... 87/124.1 |
| 4,990,042 | 2/1991 | Szayer et al. ................ 411/29 |
| 5,248,231 | 9/1993 | Denham et al. ............... 411/38 X |

FOREIGN PATENT DOCUMENTS

| | | |
|---|---|---|
| 0572598 | 12/1992 | European Pat. Off. . |
| 1963526 | 7/1970 | Germany . |
| 1750560 | 3/1971 | Germany . |
| 2554577 | 6/1977 | Germany . |
| 2820472 | 11/1979 | Germany . |
| 403056 | 7/1978 | Sweden . |
| 673792 | 4/1990 | Switzerland . |
| 567586 | 2/1945 | United Kingdom . |
| 1484260 | 9/1977 | United Kingdom . |
| 2151738 | 7/1985 | United Kingdom . |
| WO922394 | 12/1992 | WIPO . |
| WO9312347 | 6/1993 | WIPO . |
| WO9400701 | 1/1994 | WIPO . |

*Primary Examiner*—Neill R. Wilson
*Attorney, Agent, or Firm*—Weingarten, Schurgin, Gagnebin & Hayes LLP

[57] ABSTRACT

A self-drilling blind rivet includes a deformable sleeve and a shaft having a drill bit at one end. The shaft extends through the sleeve and the drill bit is connected to one end of the sleeve. The shaft and sleeve are rotatable as a unit. A method for making a riveted joint with a self-drilling blind rivet includes the steps of passing the drill bit through a work piece and pulling the drill bit entirely within the sleeve so that the drill bit does not extend beyond the end of the sleeve to which it is connected. Thus, the diameter of a portion of the sleeve in increased and the riveted joint is rendered pressure tight.

12 Claims, 3 Drawing Sheets

SELF-DRILLING BLIND RIVET AND METHOD FOR MAKING A PRESSURE TIGHT RIVETED JOINT BY MEANS OF THE SAME

FIELD OF THE INVENTION

The present invention relates to blind riveting and, more specifically, a method for making a pressure-tight riveted joint by means of a self-drilling blind rivet.

The invention also relates to the self-drilling blind rivet per se.

BACKGROUND OF THE INVENTION

Blind riveting is a most useful joining method which was originally developed at the end of the 19th century. The method is particularly applicable to the joining of metal sheets.

In conventional blind riveting, a hole is predrilled or punched through e.g. two overlapping metal sheets which are to be joined, and then the blind rivet is placed in the hole. The blind rivet comprises a shaft, and a sleeve or tubular rivet which is slipped over the shaft and has a tubular shank and a rivet head. Outside the end of the rivet shank, the shaft is formed with a thickened portion which, when tractive force is applied to the shaft, is pulled into and expands the adjacent end portion of the shank. As the application of the tractive force proceeds, the ultimate strength of the shaft is achieved and the shaft breaks inside the sleeve, where-upon the riveted joint is completed.

One drawback of conventional blind riveting is that predrilling is necessary, which requires two tools—one drilling machine and one drawing tool, a pair of so-called rivet pliers. One proposal of overcoming this draw-back is described in document DE-A-2,554,577 which discloses a self-drilling blind rivet. The self-drilling function is achieved by providing the lower end of the shaft with a drilling bit. In the driving-in operation, the shaft and the sleeve are simultaneously rotated by torque-absorbing means in the form of flat surfaces on the shaft.

However, by means of the blind rivet according to the DE-A-2,554,577, no pressure-tight joint is provided, since there is usually such a play between the sleeve and the drilled hole that air may pass. Moreover, in actual practice it often happens that the drilling bit comes loose and falls off from the deformed sleeve, whereupon air may flow freely through the sleeve. This causes further inconvenience when riveting, for example, parts of a ventilation duct, since the torn-off drilling bit will get into the duct.

U.S. Pat. No. 4,990,042 which discloses a self-drilling blind rivet certainly discusses fluid-tight riveted joints, but no special arrangements are suggested for preventing that the drilling bit comes loose during or after the riveting operation. The main object of the invention according to this US patent is to provide a special weakening of the material of the shaft such that a considerable amount of tractive force may be applied, and consequently the sleeve is completely deformed before the shaft breaks. This is achieved by means of a number of inclined flutes in the shaft.

SUMMARY OF THE INVENTION

The object of the present invention is to overcome the above-mentioned drawbacks by an effective method of providing a pressure-tight riveted joint by means of a self-drilling blind rivet.

A further object of the invention is to provide a self-drilling blind rivet which eliminates the above-mentioned drawbacks and by means of which a pressure-tight riveted joint can be obtained.

These and other objects, which will appear from the following description, have now been achieved by a self-drilling blind rivet including a deformable sleeve having a first and a second end, the first end having a flange, and a shaft having a first end and a second end. The first end of the shaft extends beyond the flange and the second end of the shaft includes a drill bit that extends from the second end of the sleeve. The drill bit is connected to the second end of the sleeve, and the shaft extends through the sleeve with such a close fit that the sleeve, shaft and drill bit constitute a unit which is rotatable.

A method of making a riveted joint with a self-drilling blind rivet includes the steps of abutting the drill bit of the blind rivet against a work piece; rotating the blind rivet and passing the drill bit through the work piece until the flange of the blind rivet abuts the work piece. The drill bit is pulled entirely within the sleeve so that the drill bit does not extend beyond the second end of the sleeve, thereby increasing the diameter of a portion of the sleeve and making the riveted joint pressure tight. Applying tension to the shaft of the blind rivet causes a first portion of the shaft to separate from a second portion of the shaft at a region of reduced tension strength.

In an alternative method, the drill bit is pulled into the sleeve to cause the second end of the sleeve to be trapped within an interior portion of the sleeve. In another method according to the invention, the distal end of the sleeve is compressed between an interior portion of the sleeve and the drill bit.

BRIEF DESCRIPTION OF THE DRAWING

The invention will now be described in more detail with reference to the accompanying drawings which illustrate some non-restrictive embodiments.

DETAILED DESCRIPTION OF THE INVENTION

Figure 1:
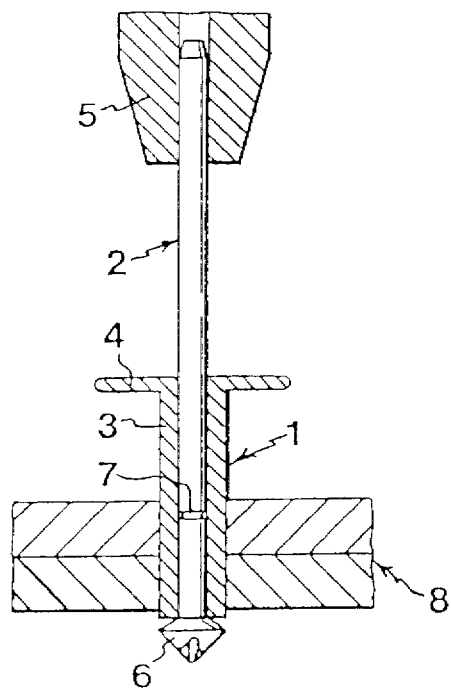
FIG. 1 is a schematic sectional view of how a self-drilling blind rivet is inserted into a workpiece.

FIG. 1 shows a blind rivet comprising a tubular rivet or sleeve generally designated 1 and, extending therethrough, a shaft 2. In a prior art manner (cf. DE-A-2,554,557), the sleeve 1 consists of a tubular shank 3 and a radially projecting, circumferential flange 4. The upper end portion of the shaft 2 extends beyond the sleeve 1 and is adapted to be gripped by a schematically illustrated tool 5 which will be described in more detail below. The other end of the shaft 2 is fitted with a drilling bit 6 for providing the self-drilling function. Moreover, the shaft 2 has a weakened portion 7 positioned in the sleeve 1.

The riveted joint illustrated is adapted to join e.g. two overlapping metal sheets with each other, which for the sake of simplicity are jointly called a workpiece 8. It will of course be appreciated that the riveted joint may be used for joining other objects.

The blind riveting procedure will now be described. The drilling bit 6 of the blind rivet is caused to engage the upper side of the workpiece 8, and the shaft 2 is caused to rotate by means of the tool 5 gripping the same. Since the shaft 2 is placed in the sleeve 1 with a close fit, the sleeve 1, the shaft 2 and its drilling bit 6 form a unit which is rotatable. When rotating the shaft 2, this unit is quickly passed through the workpiece 8 to the position illustrated in FIG. 2. Thus, the sleeve 1 is passed into the hole in the workpiece 8, which is drilled by the drilling bit 6. The entire blind rivet is rotated such that the sleeve 1 is pulled through the workpiece 8 in one operation, while the drilling bit 6 is drilled entirely through the workpiece. Preferably, the sleeve 1 is conventionally cylindrical, and the maximum cross-sectional dimension of the drilling bit 6 is of the same size, but slightly greater than the outer diameter of the sleeve 1.

Figure 2:
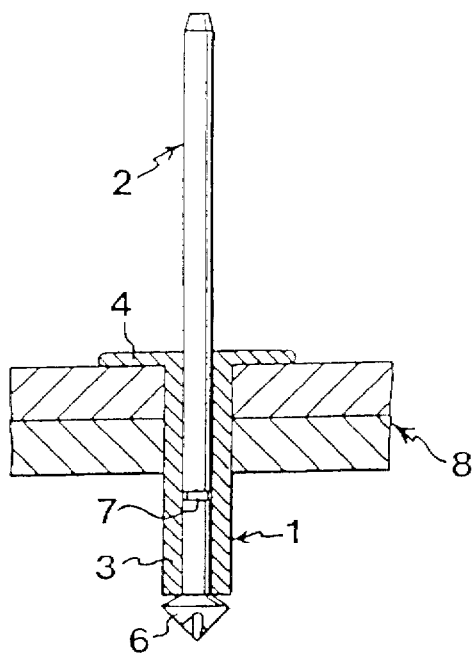
FIG. 2 shows the blind rivet fully inserted.
Figure 3:
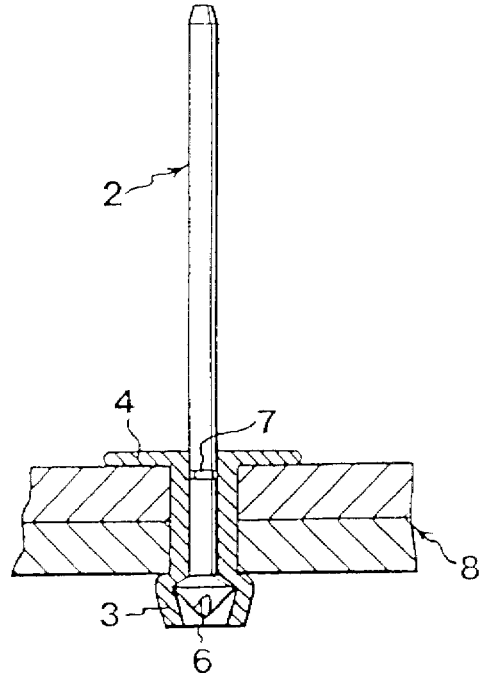
FIG. 3 illustrates how the rivet is deformed.
Figure 4:
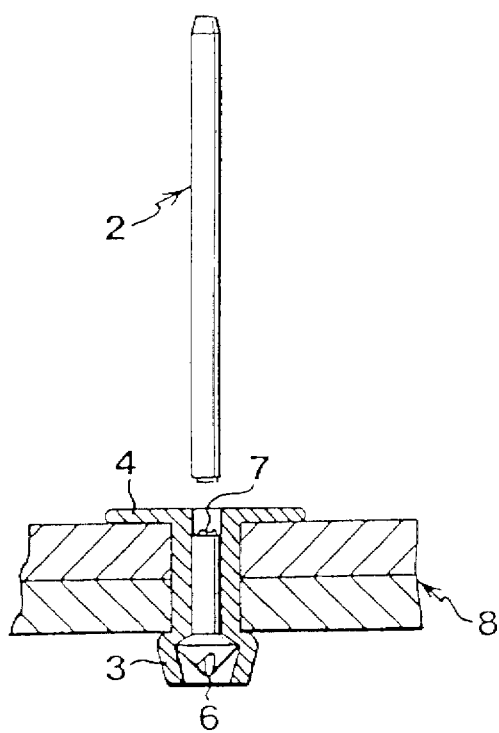
FIG. 4 shows the completed riveted joint.

As the shaft 2 continues to rotate by means of the tool 5 which for the sake of simplicity is not shown in FIGS. 2–4, the flange 4 abuts against the workpiece 8, as illustrated in FIG. 2. The rotation of the tool 5 is now disconnected, and some sort of abutment member (not shown), possibly associated with the tool 5, is caused to abut against the flange 4 for keeping the sleeve 1 against the workpiece 8.

By means of the tool 5, the shaft 2 is pulled without rotation in the direction opposite the drilling direction, i.e. from the position in FIG. 2 to the position in FIG. 3, whereby the drilling bit 6 is pulled entirely into and expands the neighbouring end portion of the sleeve 1. A permanent enlargement of the blind rivet is formed directly outside the workpiece. Preferably, about half the shank 3 is deformed. Since the drilling bit 6 is, in the starting position, placed in direct connection with the neighbouring end of the sleeve 1, the deformation begins immediately as said tractive force is applied.

When a certain amount of tractive force is applied, the shaft 2 is torn off in the weakened portion 7 inside the sleeve 7, as illustrated in FIG. 4, whereupon the riveted joint is completed. The weakened portion 7 preferably is a portion of reduced cross-section.

The shaft 2 shown in FIGS. 1–4 may be a standard-type shaft of circular or oval cross-section, the hole in the sleeve 1 having a cross-section adapted thereto with a close fit. To obtain an especially good torque-absorbing effect, the shaft and the sleeve can be provided with cooperating engaging means. The cross-sectional views in FIGS. 5–7 of the portions between the weakened portion and the drilling bit illustrate examples of such engaging means.

Figure 5:
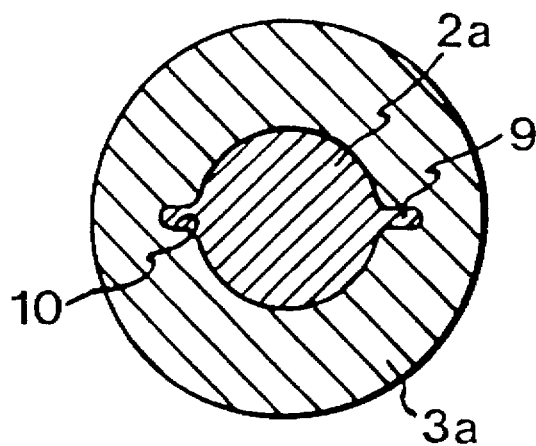
FIGS. 5–7 illustrate different alternatives for the cross-section of the blind rivet.

FIG. 5 shows a variant in which the shaft 2a is formed with projections 9 which engage matching recesses 10 in the sleeve shank 3a. The projections, which are of a certain axial extent, serve as carriers during rotation of the shaft for the drilling operation. The torsional stress which arises during drilling is absorbed by the engaging means 9, 10, and therefore the weakened portion 7 may be dimensioned mainly in consideration of the tractive force to which the shaft 2a should be subjected when pulled off at the end of the riveting procedure. The risk that the shaft 2a shall break in an undesired manner in the weakened portion 7 during drilling is eliminated owing to the cooperating, torque-absorbing engaging means 9, 10.

Figure 6:
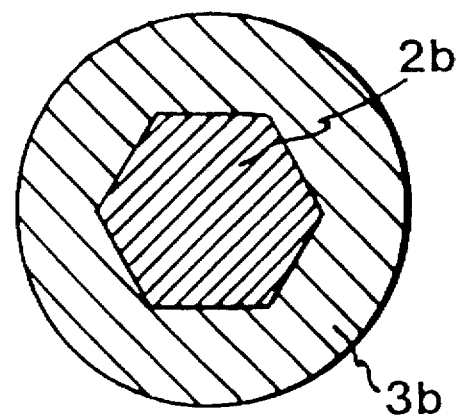
Figure 7:
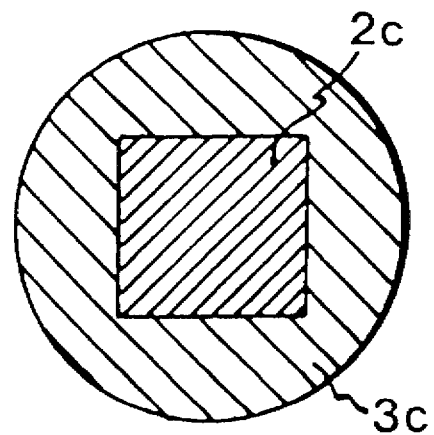

A further variant is illustrated in FIG. 6 in which the engaging means are formed by the shaft 2a being polygonal in cross-section and the hole of the shank 3b being of the corresponding cross-section, thus achieving a good torque absorption. A still further variant, based on the same idea of polygonal cross-sections, is illustrated in FIG. 7 in which the shaft 2c and the hole of the shank 3c are square in cross-section.

The engaging means, i.e. the projections 9 and the recesses 10, or the portions 2a, 2b, 2c, 3a, 3b, 3c of polygonal cross-section need, of course, be arranged only in the axial portion in which the shaft is positioned in the sleeve. The rest of the shaft may have a different cross-section, e.g. circular.

Figure 8:
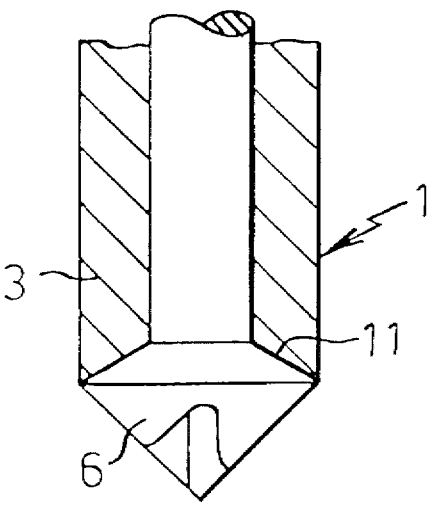
FIG. 8 shows on a slightly larger scale the lower part of a self-drilling blind rivet according to the invention, before deformation.

FIG. 8 shows how the drilling bit 6 is according to the invention connected to the neighbouring end of the shank 3 of the sleeve 1. This permanent connection 11 is preferably obtained by soldering, but it will be appreciated that other equivalent connecting methods are possible. However, the connection 11 must be so safe as to withstand the stress during the riveting procedure. A pressure-tight connection 11 is obtained by, for example, circumferential soldering. The important thing is that the drilling bit 6 is permanently kept in the enlargement.

Figure 9:
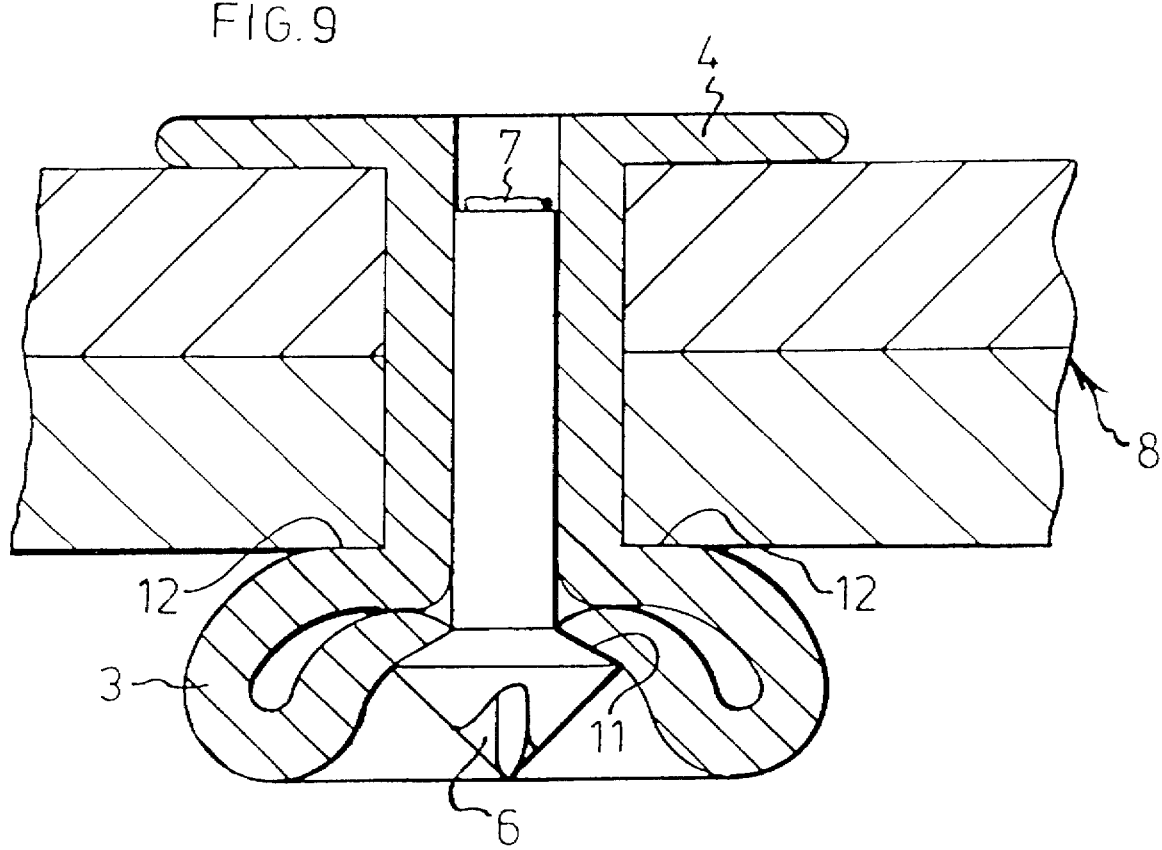
FIG. 9 illustrates on a still larger scale the blind rivet in FIG. 8, after deformation.

FIG. 9 shows how the lower portion of the shank 3 of the sleeve 1 is deformed because of the above-mentioned connection 11. As described above, the drilling bit 6 is entirely pulled into the shank 3 which is deformed in a characteristic manner. Round the drilling hole, a circumferential portion 12 of the outside of the enlargement is brought into close engagement with the lower side of the workpiece 8.

By means of the inventive embodiment as illustrated in FIGS. 8–9, a pressure-tight riveted joint is obtained, in which air cannot pass through the drilling hole owing to the engagement portion 12 or, owing to the tight and permanent connection with the drilling bit 6 which remains, through the sleeve 1 either.

The invention confers a number of advantages. The self-drilling blind rivet is designed in an exceedingly simple and, thus, inexpensive manner, without any threads that would increase the cost. The compact design of the rivet with the drilling bit connected to the neighbouring end of the sleeve permits a very quick riveting procedure, in which the entire rivet is rotated as a unit. A particular advantage is that the entire drilling bit is pulled into the sleeve such that the tip of the drilling bit does not protrude. Nor is the drilling tip broken off, which is a drawback of some of the riveting methods discussed by way of introduction.

The special advantages as achieved because of the engaging means on the shaft and in the sleeve have already been discussed above.

One and the same simple tool can be used for riveting according to the invention. The requirement is that the tool should be able to perform both rotation and pulling of the shaft. The tool can be provided with e.g. chuck-like jaws for gripping the shaft. These jaws are formed with special internal flutes, on the one hand axial flutes which are active during rotation and, on the other hand, transverse flutes which are active during pulling.

Finally, it should be emphasised that the invention is in no way restricted to the embodiments described above, and several modifications are feasible within the scope of the inventive idea as defined in the appended claims. The parts included in the blind rivet are made of suitable materials, the shaft necessarily being easily deformable and the drilling bit of course having the necessary hardness. Preferably, the drilling bit is made of tempered steel.

We claim:

1. A self-drilling blind rivet, comprising:

(a) a deformable sleeve having a first end and a second end, said first end having a flange;

(b) a shaft having a first end and a second end, said first end extending beyond said flange, said second end having a drill bit extending from said second end of said sleeve, and a region of weakened tensile strength between said first end of said shaft and said second end of said shaft, said region of weakened tensile strength dividing said shaft into a first portion and a second portion;

(c) said shaft extending through said sleeve with such a fit that said sleeve, said shaft and its drill bit constitute a unit which is rotatable; and (d) said drill bit being permanently connected to said second end of said sleeve.

2. The blind rivet of claim 1, wherein said first portion of said shaft separates from said second portion of said shaft when an axial load applied to said first portion of said shaft exceeds a predetermined level.

3. The blind rivet of claim 2, wherein said region of weakened tensile strength of said shaft has a cross-section that is smaller area than a cross-section of said first portion and said second portion of said shaft.

4. The blind rivet of claim 2, wherein said drill bit is entirely within said sleeve when said first portion of said shaft separates from said second portion of said shaft.

5. The blind rivet of claim 1, wherein said sleeve is cylindrical and a maximum cross-sectional dimension of said drill bit is greater than an outer diameter of said sleeve.

6. The blind rivet of claim 1, wherein said drill bit is soldered to said second end of said sleeve.

7. The blind rivet of claim 1, wherein said shaft and said sleeve include a torque-absorbing interface.

8. The blind rivet of claim 1, wherein said shaft frictionally engages said sleeve.

9. A method for making a riveted joint with a self-drilling blind rivet comprising a sleeve and a shaft extending therethrough, said sleeve having a first end including a flange and a second end opposite said first end, said shaft having a first end extending beyond said flange and a second end including a drill bit proximate said second end of said sleeve, and a region of weakened tensile strength between said first end of said shaft and said second end of said shaft, that divides said shaft into a first portion and a second portion; said method comprising the steps of:

(a) abutting said drill bit of said blind rivet against a work piece;

(b) rotating said blind rivet and passing said drill bit through said work piece until said flange abuts against said work piece;

(c) pulling said drill bit entirely within said sleeve so that said drill bit does not extend beyond said second end of said sleeve, said drill bit being permanently connected to said sleeve and deforming said sleeve by increasing the diameter of a portion of said sleeve, thereby making said riveted joint pressure tight; and (d) applying tension to said shaft until said first portion of said shaft separates from said second portion of said shaft at said region of weakened tensile strength.

10. The method of claim 9, wherein said step of pulling causes said second end of said sleeve to move toward said first end of said sleeve.

11. The method of claim 10, wherein said step of pulling causes said second end of said sleeve to be trapped within an interior portion of said sleeve.

12. The method of claim 11, wherein said second end of said sleeve is compressed between an interior portion of said sleeve and said drill bit.

* * * * *